March 8, 1966   J. F. LEAHY   3,239,398
METHOD OF MAKING AND REPAIRING SYNTHETIC POLYMERIC
FOOTWEAR LASTS BY FRICTIONAL HEATING
Filed Jan. 4, 1962   2 Sheets-Sheet 1
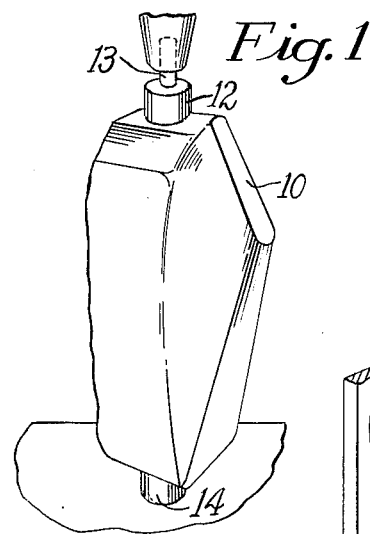
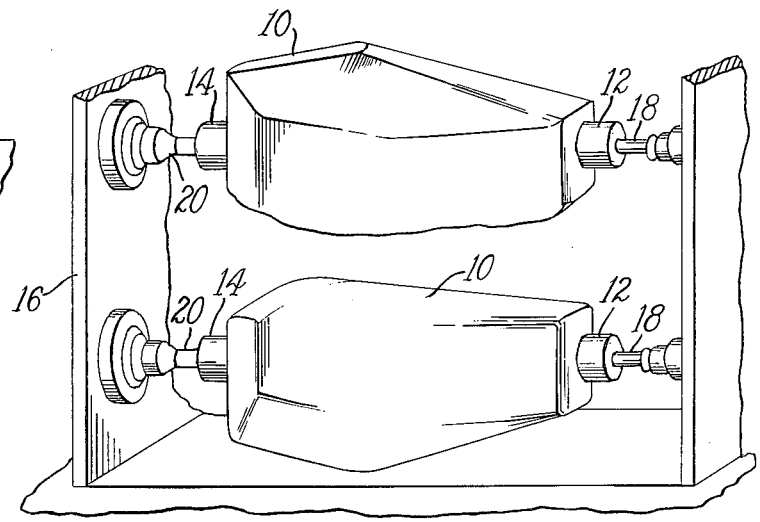
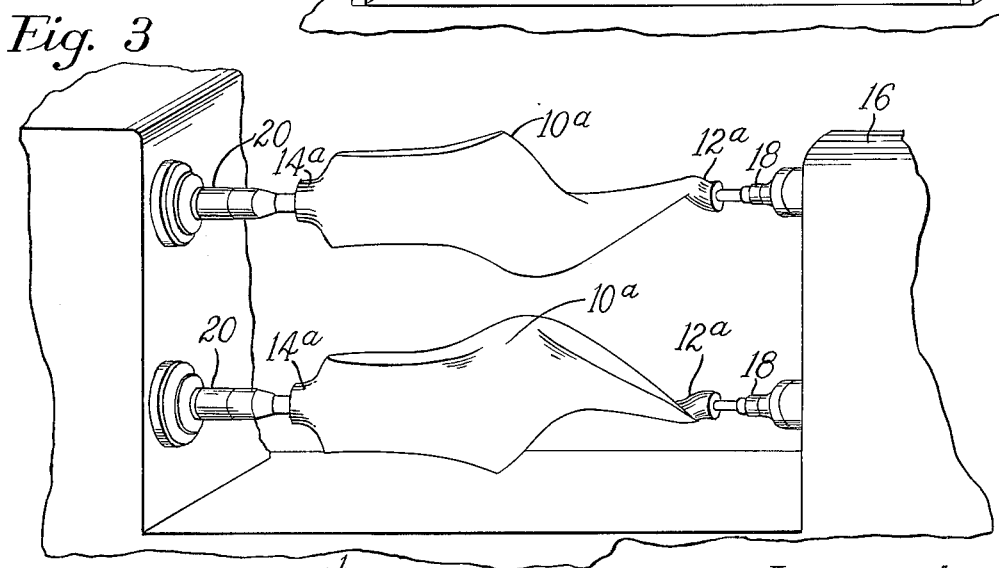
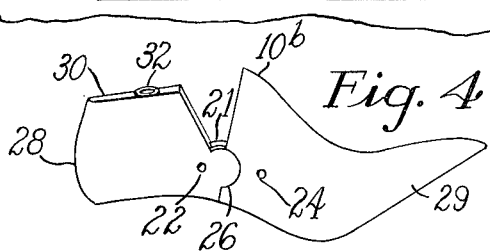
Inventor
James F. Leahy
By his Attorney

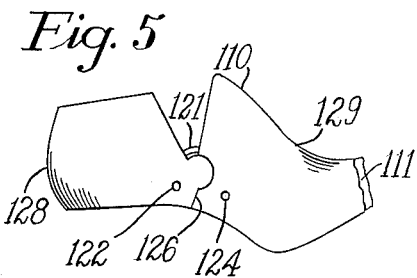
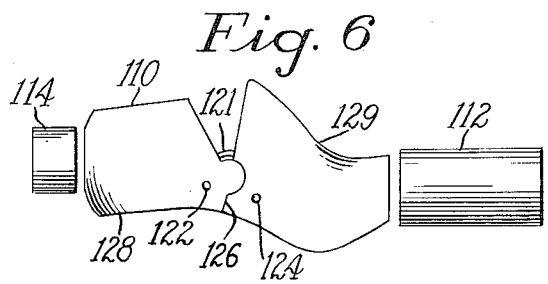
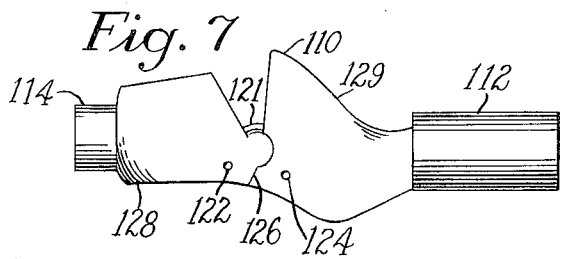
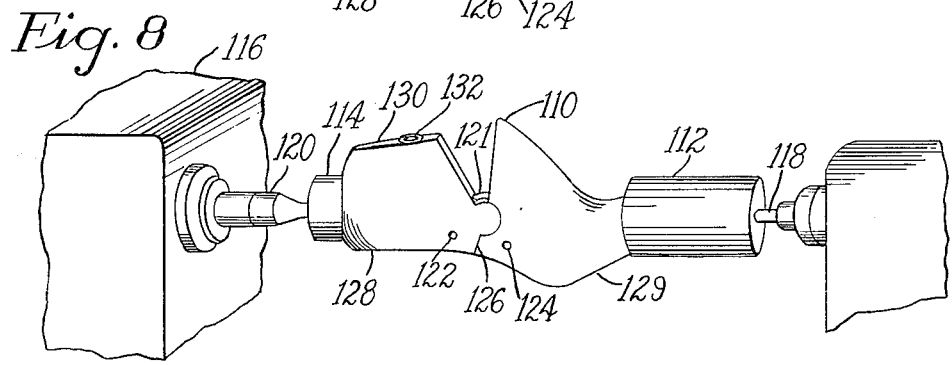
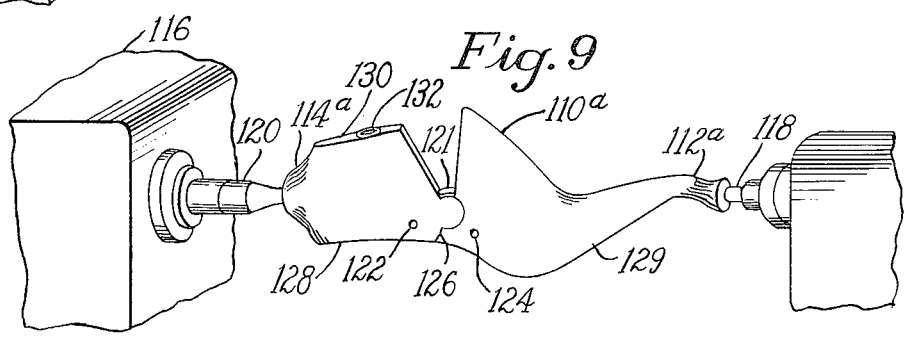
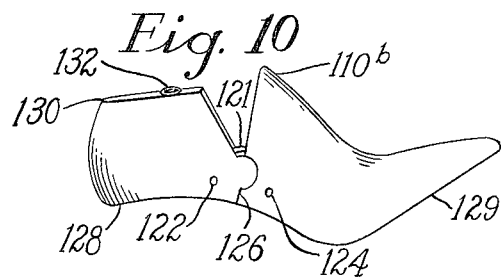

3,239,398
METHOD OF MAKING AND REPAIRING SYNTHETIC POLYMERIC FOOTWEAR LASTS BY FRICTIONAL HEATING
James F. Leahy, Beverly, Mass., assignor to United Shoe Machinery Corporation, Boston, Mass., a corporation of New Jersey
Filed Jan. 4, 1962, Ser. No. 164,251
2 Claims. (Cl. 156—73)

The present invention is directed to production of solid articles of synthetic polymeric materials and has specific application to the manufacture and repair of footwear lasts constituted of synthetic polymeric materials.

Recently synthetic polymeric materials have started to replace wood in footwear lasts.

The polymeric materials which have been found to be effective have been high density olefinic polymers including both polyethylene homopolymers and copolymers of the same, the latter including in addition to ethylene, co-monomers such as propylene, 1-butene, 2-butene and the like. High density polyolefins have densities greater than about 0.94, and are more than an adequate substitute for wood in applications of the type referred to above. The dimensional stability of these polymers is excellent; they remain relatively unchanged by variations in atmospheric conditions and temperature. By contrast, wood is prone to expand and contract reflecting these variations.

Taking footwear lasts the sizes of shoes made on wood lasts are very apt to change or vacillate significantly over a given length of time reflecting atmospheric changes. Wood lasts as a result are treated or coated, lacquered and the like at various intervals to guard against this shortcoming. Coatings are also applied to wood lasts to facilitate removal of the finished shoes from them after lasting. On either count, no such requirement exists with regard to lasts made from high density polyolefins.

The transition from wood to high density polyolefins in the production of lasts is particularly eased by the fact that the most prominent step, that of shaping the last, can in either case be carried out by a single expedient, that of shaping a solid block into a last form in a machine such as a turning lathe. This, however, presupposes at least one important prerequisite, to wit, that the last block of high density polyolefin be a solid void-free mass. Otherwise, the last obtained as a result will have not only surface but also strength defects, the latter making it less than usable in obtaining a last which can be divided into fore and heel parts and provided with pins and links which allow for shortening of the last and provide thereafter for easy removal of the last from the lasted shoe.

Obtaining solid moldings or castings of high density polyolefinic material, which are of sufficient cross sectional size for them to serve as last blocks from which to turn shoe lasts, and which are free of voids, remains a relatively difficult and expensive molding problem; in this regard see the technique and apparatus proposed for obtaining heavy moldings or castings of this material in United States Patent No. 2,911,678.

In turning a last block into a last on a lathe of necessity some of the longitudinal extension of the last block is lost as a result of having to position the block in on the head and tail stock centers of the lathe. Both centers pierce the block and leeway must be given to them during actual turning to avoid damage to the cutting knives. In anticipation of this then the practice which has been followed has been that of molding the last block oversize, or to greater length than is actually needed in the finished last. This, of course, in the case of lasts turned from last blocks molded from high density polyolefinic material contributes significantly to production difficulty and expense.

It is a specific object of this invention to provide an expedient which makes it possible for a footwear last to be turned from a preformed block of high density olefinic polymeric material in which the last block as preformed can have essentially the same longitudinal dimension as that of the finished last.

It is another specific object of this invention to provide a method for turning a footwear last from a solid block of high density olefinic polymeric material.

During lasting a footwear last is subjected to considerable force by the shoe upper being forceably drawn over and to the shape of the last. In high style ladies shoes, with their tapered and otherwise slender vamps, the fore end of the last which is of corresponding tapered and slender shape is particularly susceptible to being broken off. This situation is compounded in lasting where tacking operations are carried out incidental to the same. Then, not only is the toe portion of the forepart of the last vulnerable and liable to be broken off but also the heel portion as well. In addition, repeated use of the last, with an accumulation of tacking holes from which the tacks have been forceably removed, can lead to damage which suggests either replacing or repairing the last.

Accordingly, it is another specific object of the present invention to provide an expedient which makes it possible for a damaged footwear last of high density polyolefinic material to be turned into a reusable footwear last having the same size as that of the damaged last. In this regard then the damaged last can be considered as a last block from which a footwear last can be turned.

These and other objects of the present invention are obtained in a consolidated solid workpiece adapted to be turned into a solid shaped article the workpiece being formed from components of high density olefinic polymeric material where one of the components is a preformed solid block of high density olefinic polymeric material. In its broader aspects, the invention involves welding turning tips to the block in aligned relationship to obtain the consolidated workpiece. The consolidated workpiece can then be positioned in a turning machine by securing the turning tips in the turning stocks of the machine and turning the workpiece in the machine while contacting it with cutting means to obtain a shaped article having the same longitudinal extension as that of the original block if so desired.

A number of methods can be used for welding the turning tips to the block in order to obtain the workpiece. These include solvent welding, induction welding and the like. A preferred method makes use of the spin welding technique. This constitutes the steps of (a) providing intercontact between surfaces on the block and a tip or tips and while maintaining intercontact carrying out the steps of (b) providing rapid movement between the intercontacting surfaces thereof at least until a viscous interface is obtained as a result of heat frictionally developed by the movement, and, then (c) discontinuing the movement and allowing this viscous interface to become solidified.

The invention will be described in detail relative to the production of a footwear last from a solid preformed last block of high density olefinic polymeric material. In doing so the particular workpiece will be referred to as an extended last block. Additionally, the term last block as used is intended to have (1) a specific meaning having reference to a preformed last block or blank obtained from molding, casting and the like, which is capable of being turned into a footwear last, and, also (2) a generic meaning having reference not only to specific last blocks as defined in (1) above, but also to lasts which are damaged, broken, outmoded or in other forms making them less than attractive for use in lasting operations.

The high density polyolefins which can be used to produce lasts of interest to the present invention have densities of about 0.94, to 0.96 and above, and a softening temperature in the range of about 235–270° F. Homopolymers and copolymers of ethylene are of particular interest. Both the homopolymers and the copolymers of ethylene are produced by similar processes. In a preferred method for preparing these polymers, ethylene is polymerized in sole or with at least one of the monomers selected from the group consisting of propylene, 1-butene, and 2-butene, in the presence of an organometallic catalyst such as chromium, a portion of which is hexavalent (preferably at least 0.1 percent by weight of the total catalyst) as chromium oxide associated with at least one oxide from the group consisting of silica, alumina, zirconia, and thoria. The total chromium content of the catalyst is preferably between 0.1 and 10 weight percent.

Polymerization is ordinarily carried out at a temperature between 140° F. and 450° F., and the pressure of the reaction can vary over a wide range, for example from atmospheric pressure to 1000 pounds per square inch absolute or higher. Generally, this reaction is carried out in a gaseous phase; however, when diluent is used the minimum pressure used is that necessary to maintain the diluent in a liquid phase. Preferably solvents are used which are liquid and inert under contacting conditions, such as hydrocarbon solvents, represented by naphthenic hydrocarbons and paraffinic hydrocarbons of from 3 to 12 carbon atoms, for example, isooctane and cyclohexane. In such cases the reaction pressure is ordinarily in the range of 100 to 800 pounds per square inch absolute.

The effluent withdrawn from the reactor comprises a solution of polymer in solvent, and when slurried or suspended catalyst is used the solution also contains catalyst. Unreacted monomers are removed by flashing, and the solution with or without the addition of more solvent is filtered, centrifuged or the like to remove the catalyst. The catalyst-free solution is then passed to suitable recovery steps for removal of the solvent, such as by evaporation or flashing, and solid polymer is recovered in these steps or by precipitation.

In preparing the copolymers, the monomer feed is predominantly ethylene with amounts of comonomer ranging ordinarily from 1 to 20 and in some cases as high as 30 parts by weight per 100 parts of monomer feed. For copolymers having a softening temperature of 240° F., and above, it is preferred that the amount of comonomer in the total monomer feed not exceed 15 weight percent. The copolymers as produced by the above-described process have a density of at least 0.94 and a softening temperature of at least 235° F., with a melt index of not more than 5 and preferably not over 1.

Other polymerizations in addition to that described above which will yield high density polyolefins of sufficiently high molecular weight as well as the required melt index and softening temperature can also be employed. Examples are polymerization processes employing catalyst systems comprising organometallic compounds such as triethylaluminum with titanium tetrachloride and mixture of ethylaluminum halides with titanium tetrachloride.

To contribute to the understanding of the present invention the following illustrative drawings are included in which:

FIG. 1 is an angular view of a last block and turning tips taken immediately after their consolidation into an extended last block;

FIG. 2 is an angular view with some parts partially broken away and in section of a pair of extended last blocks corresponding to that of FIG. 1 mounted on a lathe;

FIG. 3 is an angular view with some parts partially broken away essentially corresponding to FIG. 2 but taken after the extended last blocks have been turned into last shapes;

FIG. 4 is a side view of the finished footwear last;

FIG. 5 is a side view of a footwear last constituted of high density polyolefinic material which is damaged by having a portion of the toe broken off;

FIG. 6 is a side view in which the damaged last of FIG. 5 has been provided with a flat surface at the damage, and in which turning tips constituted of high density polymeric material are aligned prior to consolidation;

FIG. 7 is a side view showing the components laid out in FIG. 6 consolidated into an extended last block;

FIG. 8 is an angular view with some parts partially broken away, showing the extended last block of FIG. 7 mounted on a lathe;

FIG. 9 is an angular view, some parts partially broken away, corresponding to FIG. 8 but taken after turning has been completed; and FIG. 10 is a side view of the repaired footwear last.

The sequence of operations shown in FIGS. 1–4, illustrates one embodiment of the present invention. Referring to those figures, a solid, void-free rough molded last block 10 of high density polyolefinic material is consolidated, longitudinally extended, into an extended last block by welding turning tips 12 and 14 which are of solid cross-section of the same material as designated for the last block in aligned relationship at each of the ends of block 10. In anticipation of welding, each of last block 10 and tips 12 and 14 are provided with flat surfaces at their anticipated points of contact, that is where welding is to take place. When flat surfaces are used they can be machine flat, or they can be quite rough and, in fact, a rough saw finish works well for present purposes. In addition to being flat, the surfaces can take other cross-sectional configurations, such as convex-concave and others which are complementary to one another. In order to consolidate the three components into a welded and so unitized extended last block as shown in FIG. 1, last block 10 can be secured in a jig (not shown) for the purpose of holding it stationary, with turn tips 12 and 14 aligned longitudinally from the ends of last block 10 where intercontact between the surfaces of these components is desired. While maintaining the said intercontact, a tip 12 is provided with movement in the plane interfacially of the intercontacting surfaces as by rotating the same through transmitting power from a source, not shown, to a spindle 13 on which tip 12 is stationed. Actually, movement can be provided in either or both last block 10 and a tip 12, but, the more simple expedient of moving only one component while retaining the other stationary can result in quick melting at both surfaces of the interface and simplifies the problem of maintaining proper alignment between the components during the welding process.

The heat frictionally generated between the intercontacting surfaces of last block 10 and a tip 12 is partially a function of the relative surface velocity resulting from the rubbing movement provided to them. In this regard the movement can be of any type provided it is interfacial of the intercontacting surfaces, with that which is either rotational or reciprocal and more precisely the former being the most convenient to obtain and regulate. In addition the amount of frictional heat obtained between the intercontacting surfaces is dependent upon contact pressure, duration of contact between surfaces, also the coefficient of friction of the particular high density polyolefin from which the components are constituted and the heat transfer capacity of the same. While these functions can be calculated to arrive at a precise determination of conditions, an elaborate determination of this nature is not necessary for successful practice of the invention. Rather the pressure and movement necessary to obtain sufficient frictional heat leading to interfacial melting can be quickly established through observation.

When sufficient melting of the high density polyolefinic material located at the intercontacting surfaces has taken place, preferred practice calls for increasing mechanical pressure between the intercontacting surfaces in order to squeeze out any air entrapped by the melt and to insure dispersion of the melt uniformly between the said surfaces.

After a viscous, melted or liquid, interface is obtained the stationary last block 10 is released, or the power transmitted to the spindle holding tip 12 is shut off in order that the relative movement between the intercontacting surfaces be discontinued, and while maintaining intercontact between the surfaces and the desired alignment between the last block 10 and tip 12, the viscous interface is allowed to become solidified. Cooling can be applied if desired to speed up solidification of the interfacial melt.

While the above description has referred to the welding of a single turning tip 12 to last block 10, it supposes that the same procedure be repeated in welding the second turning tip 14 to last block 10 to obtain an extended last block. By varying the procedure somewhat it is also possible to weld both turning tips 12 and 14 to last block 10 in a simultaneous manner.

A pair of extended last blocks made as previously indicated, each constituted of welding last block 10 and turning tips 12 and 14, are then mounted in a lathe 16 generally shown in FIG. 2. Tips 12 are stationed by tail stock centers 18 as shown, while tips 14 are stationed in head stock centers 20. Head stock centers 20 are powered while tail stock centers 18 are dead. Following techniques in practice for turning lasts from wood last blocks last shapes 10a as shown in FIG. 3 are obtained. As can be seen in FIG. 3 the turning tips 12a and 14a are shaped to some extent during the turning operation. In machine turning of this type, it is common practice to use a double turning step; first is a rough turning which is followed by a smooth or finished turning.

After turning out a last shape as shown in FIG. 3, it is removed from lathe 16 and excess portions of turning tips 12a and 14a are sheared off the last shape 10a by convenient means. The last shape 10a then is cut and slotted, and provided internally with a slip link 21, the latter anchored by pins 22 and 24. The finished last 10b, which results as shown in FIG. 4, can be slipped at hinge line 26 to shorten it and facilitate its removal from a shoe, after lasting. The heel part 28, as differentiating from the forepart 29 of last 10b, is drilled through its upper face and provided with a plate 30 having a spindle slot 32.

FIGS. 5–10 show in sequence the steps which can be practiced in another embodiment of the present invention. In this embodiment a damaged footwear last 110 constituted of high density polyolefinic material is repaired. The numbers used to designate the various parts in this sequence of figures effectively correspond to those used in describing the previous embodiment, with the exception that each of those numbers is now preceded by an integer of one. Preliminary to welding, the broken section 111 of damaged footwear last 110 is provided with a surface which lends itself more favorably to being welded. In one method for doing this the broken edges of broken section 111 are sheared off to give a clean flat surface at the broken section, which is normal to the longitudinal axis, of damaged last 110 shown in FIG. 5. This can be accomplished in other ways as well, depending upon the nature of the particular damage, its location on the last, and the size and configuration which it is desired to have at the surface to be welded. As in the previously described embodiment the surface can be flat, or complementary to that corresponding on the tip. In many instances the broken surface 111 may require nothing more than cleaning, brushing or the like in order to clear away foreign matter which could interfere with obtaining a good weld. The trailing end of heel part 128 is readied in the same manner preparatory to welding turning tip 114 onto the same. The damaged last 110 is aligned with turning tips 112 and 114 as shown in FIG. 6, and this assembly is consolidated into an extended last block as shown in FIG. 7 by again following the welding procedure described in the earlier described embodiment. The extended last block constituted of components, block 110 and turning tips 112 and 114, is placed in tail stock center 118 and lead stock center 120 of lathe 116 as shown in FIG. 8 to be turned into last shape 110a which includes turning tips 112a and 114a as shown in FIG. 9. Turning tips 112a and 114a are then sheared off to leave a repaired and reusable footwear last 110b of high density polyolefinic material as shown in FIG. 10.

The following example is included for the purpose of further illustrating the present invention:

*Example I*

A solid void-free last block having in general the configuration of that shown in FIG. 1, overall length 11.5 inches, width 3.5 inches, and height 4.5 inches and weighing on the order of 4 pounds is molded from a copolymer constituted of 3% by weight 1-butene and 97% by weight ethylene, the copolymer having a density of 0.95 and a softening point of 253° C. The last block is set in a jig and clamped in the bed of a drill press with its longitudinal axis in perpendicular alignment. A turning tip, cylindrical in shape 1.5 x 1.5 inches and constituted of the same copolymer described immediately above is headed onto the spindle of the drill press and lowered into axial alignment with the last block. While maintaining slight pressure contact between the tip and the block, the spindle of the drill press is actuated at 2250 r.p.m. for a period of 3 seconds. At this point an interfacial melt of 0.0675 inch depth on each of the turning tip and last block is attained, pressure on the spindle is slightly increased; within 2 seconds rotation of the tip is stopped abruptly by the combination of shutting off the power to the spindle and further increasing the downward pressure on the spindle. The assembly is then maintained stationary for a period of 5 seconds at ambient temperature allowing the interface to become solidified. The consolidated last block and turning tip article is then removed from the drill press, its position in the jig reversed and the jig then clamped again into the drill press bed. A second turning tip identical with that described above, is stationed on the spindle and the welding operation as described previously is repeated.

The extended last block which now has turning tips at both of its ends is placed in a Donzelli Rough Turning Lathe and is given a rough turning. It is removed and placed in Schellenberger Finish Last Turning Lathe and given a smooth turning. At this point a footwear last shape is obtained from which the turning tips can be sheared, the last shape divided into heel and fore parts, and following that provided with a pinned slip link, face plate, and other adaptations carried out on the same which are adapted to facilitate obtaining a footwear last capable of commercial use.

It will thus be seen that the objects set forth above, among those made apparent from the preceding description, are efficiently obtained and, since certain changes may be made in carrying out the above method and in the articles obtained from the same, without departing from the scope of the invention, it is intended that all matter contained in the above description and shown in the accompanying drawings shall be interpreted as illustrative and not in a limiting sense.

Having thus described my invention, what I claim as new and desire to secure by Letters Patent of the United States is:

1. A method for providing an extended last block adapted to be turned into a footwear last from a solid block of high density olefinic material which comprises the steps of (a) intercontacting surfaces on said block and a turning tip of high density polyolefinic material and while maintaining said intercontact, (b) providing rapid movement between said surfaces at least until a viscous interface is obtained as a result of heat frictionally developed by said movement and then (c) discontinuing said movement and allowing the viscous interface to become solidified.

2. A method for providing a damaged footwear last of high density olefinic polymeric material in the form of an extended last block adapted to be turned into a usable footwear last which method comprises welding at least one turning tip of said material onto said block in aligned relationship by the steps of (a) intercontacting a surface of the said damaged footwear last at the damage site with a surface on said turning tip and while maintaining said intercontact carrying out the steps of (b) providing rapid movement between said surfaces at least until a viscous interface is obtained as a result of heat frictionally developed by said movement, and then (c) discontinuing said movement and allowing the viscous interface to become solidified.

References Cited by the Examiner
UNITED STATES PATENTS

| | | | |
|---|---|---|---|
| 157,412 | 12/1874 | Morrison | 18—46 |
| 328,843 | 10/1885 | France | 154—43 |
| 2,135,173 | 11/1938 | Clausing | 12—130.9 |
| 2,349,374 | 5/1944 | Pym | 12—142 |
| 2,505,647 | 4/1950 | Norris | 156—306 XR |
| 2,511,168 | 6/1950 | Martin et al. | 154—43 |
| 2,911,678 | 11/1959 | Brunfeldt | 264—102 |
| 2,933,428 | 4/1960 | Mueller | 156—73 |
| 2,956,611 | 10/1960 | Jendrisak et al. | 264—68 XR |
| 3,002,871 | 10/1961 | Tramm et al. | 156—73 |
| 3,067,442 | 12/1962 | Bialy et al. | 12—133 |
| 3,122,762 | 3/1964 | Chatjimikes | 12—130.9 |

OTHER REFERENCES

Plastics, "Fabrication by Friction," December 1945, pp. 64, 66–67 and 113–115.

EARL M. BERGERT, *Primary Examiner.*